Apr. 10, 1923.

H. O. WINKLER

BATCH MIXER AND METER

Filed Oct. 18, 1921     5 sheets-sheet 1

INVENTOR
H. O. Winkler
BY Robb, Robb & Hill
ATTYS

Apr. 10, 1923.

H. O. WINKLER

BATCH MIXER AND METER

Filed Oct. 18, 1921

INVENTOR
H. O. Winkler
BY Robb, Robb & Hill
ATTYS

Apr. 10, 1923.

H. O. WINKLER

BATCH MIXER AND METER

Filed Oct. 18, 1921   5 sheets-sheet 3

INVENTOR
H. O. Winkler
BY Robb, Robb & Hill
ATTYS

Patented Apr. 10, 1923.

1,451,483

UNITED STATES PATENT OFFICE.

HENRY O. WINKLER, OF LOS ANGELES, CALIFORNIA, ASSIGNOR TO KOEHRING COMPANY, OF MILWAUKEE, WISCONSIN, A CORPORATION.

BATCH MIXER AND METER.

Application filed October 18, 1921. Serial No. 508,425.

*To all whom it may concern:*

Be it known that I, HENRY O. WINKLER, citizen of the United States, residing at Los Angeles, in the county of Los Angeles and State of California, have invented certain new and useful Improvements in Batch Mixers and Meters, of which the following is a specification.

In the mixing of successive batches of materials, such as concrete, it is of importance that all of the batches shall be thoroughly and properly mixed and also that the mixing time for each batch shall be substantially the same so that a uniform output is obtained.

This is especially true in the mixing of concrete, although where the mixing time is left to the judgment of a workman and the drum or mixer permitted to operate for a greater or less length of time, at the caprice of the operator, the different batches of materials are not uniformly mixed. This difficulty is avoided by the use of a mechanism which accurately measures the mixing period for the successive batches of materials and prevents the discharge of the mixer until after the expiration of the predetermined mixing time. The attendant is thus prevented from discharging the mixed product from the mixer until after it has been agitated and mixed for a prescribed period of time. The mixing period thus becomes a known quantity instead of a variable quantity and uniformly mixed batches are discharged with regularity from the mixer. Under mixing is rendered impossible and, at the same time, the day's yardage or output is not penalized by an excessive mixing time. The use of an accurate and dependable device for this purpose also tends to avoid disputes with inspectors where the specifications for the work specify a minimum time that the concrete shall remain in the mixing machine.

These devices have become known in the art as batch meters, and are of two types. First, those batch meters having a mechanism which is directly driven by the drum or some moving part of the machine and in effect measures time by the number of revolutions of the drum, as exemplified in Patent #1,282,558 to Ferguson and Wig. Second, those batch meters having a mechanism which is not driven or actuated from the drum or a moving part of the mixer, but which measures the time or period of mixing independently of any drive from the mixer, this second type of batch meter being exemplified in Patent #1,321,460 to Erich H. Lichtenberg, wherein a gravity timing device is used. The present batch meter is of that general type disclosed by the Lichtenberg patent and provides novel means for accurately measuring the mixing time of the batches, the mechanism being adjustable so that this mixing time can be varied within proper limits as may be found necessary under different conditions and when used in connection with different kinds of mixers.

In the use of apparatus like that of the Ferguson and Wig patent previously mentioned, considerable difficulty is experienced under practical conditions of manufacture in establishing operative connections between a batch meter and the mixer itself when the control is to involve the principle of a predetermined mixing time established by the number of revolutions or movements of the mixing drum or element. The difficulty mentioned resides in the fact that in building concrete mixers various capacities of machines are produced, and owing to the different sizes, the mixing drums and the frames are differently related. On this account each size machine has to have built therefor special driving connections between the mixing drum and the batch meter, and these special connections give rise to a much increased expense as compared with the employment of a batch meter of the Lichtenberg type where the time factor is arbitrarily controlled by timing means that does not necessitate any connection with the mixing drum to maintain said timing means in action. As previously suggested, therefore, the improvements hereof are intended to perfect the Lichtenberg type of batch meter and to avoid the difficulties of practical manufacture incident to the use of the other type of revolution control batch meter. Since the time factor which corresponds with the predetermined mixing time is the same whether the batch meter is operated from the drum, or by an independent operating timing contrivance, this phase of the utility of the batch meter is in no way detracted from by the employment of the mechanism set forth hereinafter.

For a full understanding of the invention, reference is to be had to the following description and accompanying drawings in which.

Corresponding and like parts are referred to in the following description and indicated in all of the views of the drawings by like reference characters.

Figure 15:
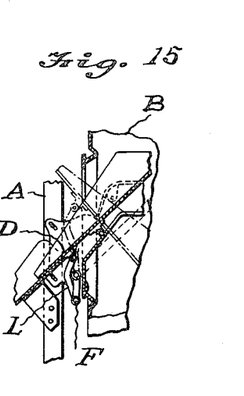
Figure 15 is a detail view of the discharge chute for the mixer, the chute being shown by full lines in discharging position and by broken lines in non-discharging position.
Figure 16:
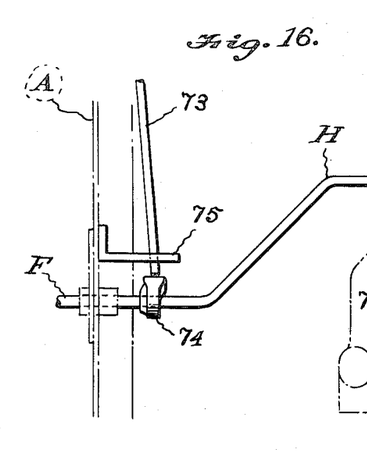
Figures 16 and 17 are enlarged detail views showing the manner in which the lock plunger cooperates with a cam disc on the discharge chute operating shaft to control the movements of the shaft.

For the purpose of illustration the batch meter is shown by the drawings as applied to a conventional type of paving concrete mixer, although it will be understood that it can be utilized in connection with any type of mixing machine where such a device is found desirable. On the drawings, the reference character A designates the frame of the mixing machine, B the power driven mixing drum which rotates continuously when the machine is in operation, C the loading skip, and D the discharge chute. The loading skip is pivotally connected to the frame at E and a power mechanism is provided for swinging the same upwardly to charge the contents thereof into the mixing drum. The discharge chute D is of the type shown by Patent #1,126,487 to Koehring, being pivotally mounted so that it can be swung into reversely inclined positions. In one of these positions it assists in the mixing of the materials and throws them back into the drum, while in the other position it discharges the mixed materials from the drum. I do not limit myself to this or any particular type of discharge chute, the construction of the latter not being material. A shaft F is operatively connected to the discharge chute D by links L as shown by Figure 15, and is rotated by either hand or power means to operate the discharge chute. A boom M with an associated bucket (not shown) is employed to distribute the concrete. This is a construction which is well known in the art of concrete mixing and paving machines, and it is not thought that any further description of the construction and manner of operation of the mixing machine itself is necessary.

The timing mechanism of the batch meter is housed within a casing 1 which is rigidly secured to the frame A in some suitable position. The door 1ᵃ of the casing may be held in a closed position by a suitable locking means such as that indicated at 2 so that any unauthorized tampering with the batch meter mechanism after it has been properly set and adjusted, is rendered impossible. In the present instance, the door 1ᵃ is provided with a transparent window 3 through which the batch counter 4 is visible.

A main shaft 5 extends through the back of the casing 1 which is provided with a rearwardly extending boss 6 to receive the same. A hub 7 is rigidly secured to the rear end of the main shaft, while a re-setting arm 8 is rigidly secured to the inner end of the main shaft. A sleeve 9 is applied to the main shaft between the members 7 and 8 and an escapement operating lever 10 is mounted upon this sleeve between the resetting arm 8 and the back of the casing. If desired, anti-friction rollers 11 may be used at the pivot end of the escapement operating lever 10. The outer end of the said lever 10 is provided with a weight 12 and the lever is formed with a web 13 having a segmental rack 14 thereon. This rack is suitably connected, through the gearing 15, with the main shaft 16 of an escapement mechanism which is provided within the box 17. The escapement mechanism may be of any suitable character. As shown on the drawing, the shaft 16 has a pawl and ratchet connection 18 with a master gear 19 which meshes with a pinion 20 on a counter shaft 21 carrying the escapement wheel 22. An escapement shaft 23 extends transversely across the escapement wheel and is provided with the suitably inclined arms 24 which engage the peripheral teeth of the escapement wheel at diametrically opposite points thereof. The upper end of the escapement shaft 23 is provided with a cross head 25 having adjustable weights 26 upon the ends thereof. The cross head and weights act as a balance wheel to govern the movements of the escapement shaft 23 which is caused to rotate alternately in opposite directions as the escapement wheel 22 rotates with a step by step movement. The construction is such that when the escapement operating lever 10 is swung upwardly the pawl and ratchet connection 18 permits the shaft 16 to rotate independently of the master gear wheel 19. As soon as the lever 10 is released the weight 12 thereof tends to swing the lever back to its original position, although the pawl and ratchet connection 18 now brings the escapement mechanism into action so that the return movement of the weighted lever is delayed and requires a certain fixed time, depending upon the extent of the arc through which the lever was originally swung upwardly. The mixing time for the concrete is measured by the time required by this weighted lever to return to its original position, and means is provided for regulating the distance the weighted lever will be raised when starting the mechanism into operation, so that a longer or shorter mixing time can be provided, as may be required.

The hub 7 at the rear or outer end of the main shaft 5 has a bar 27 adjustably secured thereto, and a plunger 28 is pivotally connected to the said bar. This plunger engages suitable guides 29 on the mixer frame A and terminates in an arm 30 which is arranged in the path of a suitable projection 31 on the loading skip C of the mixer. This projection may be provided with a roller for the purpose of reducing wear and friction between the parts, and the relation of the parts is such that when the loading skip is swung upwardly to deliver the contents thereof into the drum, the projection 31 engages the arm 30 and moves the plunger 28 to rotate the main shaft 5 and swing the resetting arm 8 upwardly against the action of a spring 32 which has one end thereof connected to the casing 1 while the other end thereof is connected to a projection at the pivot end of the resetting arm. The nose of the resetting arm then engages a projection 33 on a dog 34 which is pivoted on the escapement operating lever 10. The said lever 10 is thus swung upwardly with the resetting arm 8 until the dog 34 is disengaged from the resetting arm. In this connection it will be noted that the dog is formed with a lateral wing 35 which is adapted to engage an adjustable abutment such as the stem of a clamping screw 36 which is utilized to secure a block 37 in an adjusted position upon a quadrant 38. As soon as the wing 35 engages the abutment thus provided the dog 34 is swung outwardly and disengaged from the nose of the resetting arm 8, thereby enabling the latter to continue in its upward movement independently of the escapement operating lever which has thus been released and now starts upon its return movement. The quadrant 38 may be suitably marked, as shown at 39 to indicate the proper positions for the block 37 to obtain the desired mixing period. By moving the block up and down upon the quadrant 38 the mixing period can be increased or decreased, as desired, and the device can be set within proper limits for any desired mixing time, as may be dictated by the character of materials being mixed, the kind of work being done, or the type of mixing machine in connection with which the batch meter is used. As soon as the escapement operating lever 10 is disengaged from the resetting arm 8 it starts upon its downward movement which is governed by the escapement mechanism, and when the loading skip C is lowered the resetting arm 8 is immediately returned to its original position by the action of the spring 32. At the lower limit of its movement the escapement operating lever 10 engages an abutment 40 projecting from the back of the casing. The resetting arm 8 is limited in its movements by a pair of abutments 41 projecting rearwardly from the casing and arranged for engagement with a stop member 42 upon the hub 7.

Figures 10, 11, 12:
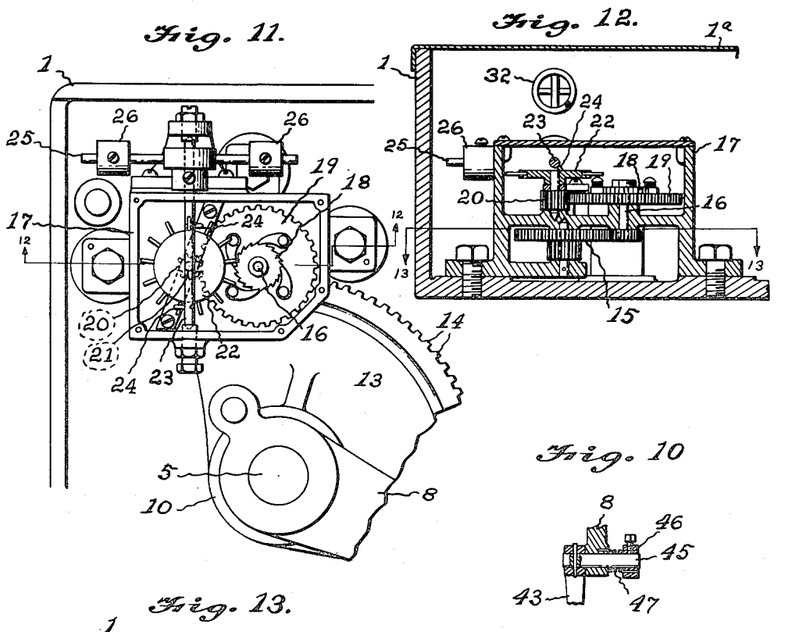
Figure 10 is a similar view on the line 10—10 of Figure 2.
Figure 11 is a detail view of the escapement mechanism, the cover of the box within which it is mounted being removed.
Figure 12 is a horizontal sectional view on the line 12—12 of Figure 11.
Figure 13:
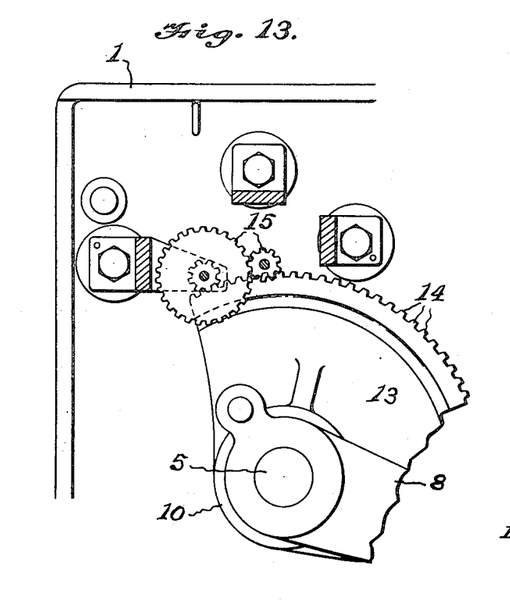
Figure 13 is a vertical sectional view on the line 13—13 of Figure 12.
Figure 14:
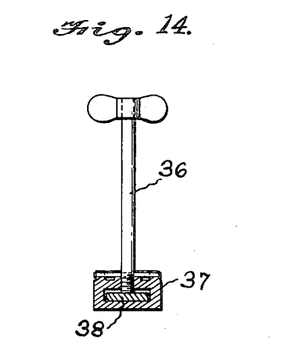
Figure 14 is an enlarged detail view of the block and set screw which are adjustably mounted upon the quadrant and enable the device to be set for a longer or shorter mixing time as may be desired.

Depending from the resetting arm 8 is a hook member 43 which is formed with a cam tail piece 44. The hook member may be pivotally connected to the resetting arm in any suitable manner. In the present instance, as indicated by Fig. 10, it is rigid with a short shaft 45 which extends through the resetting arm and has a collar 46 rigidly secured to the end thereof. A coil spring 47 surrounds the shaft 45 and has the opposite ends thereof secured to the resetting arm 8 and collar 46, respectively. The arrangement of the spring is such that the tension thereof normally tends to swing the hook member 43 into engagement with a laterally projecting stud 48 carried by one end of a control lever 49.

The control lever 49 is freely mounted upon a shaft 50 which extends rearwardly through the casing 1 and is journalled in a bearing 51 formed in connection with the casing. A stiff coil spring 52 connects the control lever 49 with a lever 53 which is rigidly secured to the shaft 50 and is engaged by the spring 54. A pawl 55 hangs from the end of the control lever 49 which is remote from the stud 48, said control lever being pivotally mounted between its ends and retained in position upon the shaft by means of a collar 56 which is rigidly secured to the shaft in any suitable manner. A spring 57 engages the pawl 55 and normally tends to hold the same in a yielding engagement with a fixed pin 58 which projects from the back of the casing. At the lower end of the pawl 55 is a hooked nose which is arranged for engagement with one end of a tappet operating lever 59, said lever being pivotally mounted between its ends at 60 and the other end thereof engaging a tappet rod 61 which extends slidably through the bottom of the casing 1 and is operatively associated with the mechanism of a conventional bell member 62, so that a signal is given by sounding the bell when the tappet rod is forced downwardly by the lever and released. The ringing of the bell constitutes a signal means for indicating to the attendant that the mixing period has ended and the lock been released, so that he can cause the batch to be discharged from the mixer. The swinging movement of the tappet operating lever 59 is limited by an abutment 63 which projects from the bottom of the casing.

When the resetting arm 8 is at the lower limit of its movement the hook member 43 is in engagement with the stud 48 of the control lever 49. When the loading skip C is swung upwardly to charge the mixing drum, a sliding movement is imparted to the plunger 28 and the resetting arm is swung upwardly, as has been previously described. The control lever 49 is then swung upon its bearing and moved against the action of the spring 54. This results in lowering the pawl 55 and bringing the hooked nose thereof into an operative engagement with the end of the tappet operating lever 59. At the same time, the extremity of the control lever which is provided with the stud 48 is brought into engagement with a locking detent 64, whereby the control lever is prevented from being returned to its original position by the action of the spring 54 until after the locking detent 64 has been released. As soon as the control lever has thus been swung into operative position and engaged by the locking detent 64, the cam tail piece 44 of the hook member 43 engages a fixed stud 65 projecting from the back of the casing and is thereby swung laterally out of engagement with the stud 48 of the control lever. This enables the resetting arm to continue in its upward movement independently of the control lever. Upon the return or downward movement of the resetting arm 8, the hook member 43 slips over the stud 48 of the control lever and resumes its original position.

The locking detent 64 is pivoted upon a pin 66 projecting from the back of the casing 1, and a spring 67 normally tends to urge the same into operative position. A rearward extension 64$^a$ of the locking detent projects into the path of an adjustable abutment 68 on the escapement operating lever 10. The member 68 is in the form of a pin which has a threaded engagement with the lever 10 so that it can be adjusted in and out, and a locking nut 69 is provided for holding the pin in an adjusted position. The adjustment is such that when the escapement operating lever 10 reaches the lower limit of its movement, the pin or abutment 68 engages the rearward extension 64$^a$ of the locking detent 64 and swings the said detent against the action of the spring 67 to disengage the nose thereof from the control lever 49. Upon being thus released the control lever is swung back to its original position by the action of the spring 54. The pawl 55 is thereby moved upwardly and the tappet operating lever 59 operated to ring the bell. The pawl 55 is formed with a cam 70 which cooperates with a fixed stud 58 projecting from the back of the casing to swing the pawl laterally against the action of the spring 57 and disengage the hooked nose thereof from the tappet operating lever 59 after the latter has been moved a sufficient amount. Upon being thus released, the tappet operating lever 59 returns to its original position in engagement with the abutment 63, its end nearest the pawl 55 being heavier than its opposite end, and when the control lever 49 is again swung into operative position by the upward movement of the resetting arm 8, the pawl 55 is guided into operative engagement with the end of the tappet operating lever 59 and the parts thereby set in proper position for another operation.

Figure 17:
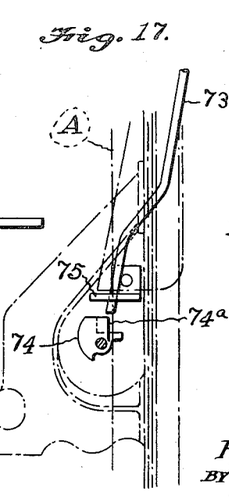

The shaft 50 normally rotates with the control lever 49 and one end of this shaft is provided with a crank arm 72 which is connected to a downwardly extending plunger 73. In Fig. 17 this plunger cooperates directly with a disc or cam member 74 on the discharge chute operating shaft F to prevent rotation of the shaft to bring the discharge chute D into discharging position until after the materials have been mixed for the prescribed length of time, as determined by the batch meter. Suitable guide means 75 are provided upon the frame A of the mixer to direct the plunger 73 in its up and down movements, and the cam member 74 is formed with a flat face 74ª which is adapted to be engaged by the end of the plunger to lock the discharge chute operating shaft F against rotation.

When the control lever 49 is swung against the action of the spring 54 and brought into operative position, the corresponding rotation of the shaft 50 swings the crank arm 72 and moves the plunger 73 to bring the end thereof in engagement with the flat face of the cam member 74. The discharge chute operating shaft F is then locked against rotation so that it is impossible for the attendant to rotate the shaft and bring the discharge chute into position for discharging the mixing drum. On this particular form of mixer, the shaft F is shown as provided with a handle H which is manually manipulated for the operation of the discharge chute.

At the same time that the locking mechanism is thrown into operative position, as just described, the escapement operating lever 10 is swung upwardly for an extent of movement depending upon the length of the desired mixing time. The return movement of the escapement operating lever 10 is retarded by the action of the escapement mechanism, as previously described, and the adjustment of the parts is such that the time required for the return of the escapement operating lever 10 to its original position corresponds with the mixing period, or the time which must elapse between the charging of the cement and aggregate into the drum and the discharging of the mixed concrete therefrom. At the end of the mixing period, the escapement operating lever 10 reaches the lower limit of its movement and the locking detent 64 is disengaged from the control lever 49. Upon being thus released the control lever is moved by the action of the spring 54 and the bell sounded, as previously described. Simultaneously, the shaft 50 is rocked and the plunger 73 moved upwardly out of engagement with the cam member 74, thereby releasing the discharge chute operating shaft F so that the attendant can swing the discharge chute into position for discharging the mixing drum.

The invention also contemplates the provision of a counter for registering the batches that are mixed, thereby enabling a check to be kept upon the output of the mixer. The batch counter 4 which has been previously mentioned is shown as mounted within the upper portion of the casing 1 so that it is visible through the glass 3 of the casing door 1ˣ. This counter may be of any suitable or conventional construction, and the operating shaft 76 is provided with a crank arm 77 which is connected by a rod 78 to some suitable moving part of the mechanism, such as to the stud 48 of the control lever 49. The same movement of the control lever which releases the locking mechanism and actuates the signal or alarm also operates the batch counter 4. An accurate count is thus made of the batches of material which are mixed and a check can thus be readily made upon the daily output of the mixer.

In the operation of the device, the block 37 is moved to an adjusted position upon the quadrant 38, depending upon the length of time it is desired to subject each batch of materials to, the action of the mixer. The mixing period is lengthened by moving the block upwardly upon the quadrant, and shortened by moving the block downwardly upon the quadrant. The scale 39 upon the quadrant enables the block to be accurately set according to the mixing time which has been determined upon. The door 1ª of the casing is then locked so that all unauthorized tampering with the batch meter mechanism is rendered impossible. The adjustment of the mechanism cannot be changed by an unauthorized person to vary the mixing time, and each batch of materials will remain in the mixer exactly the same length of time, with the result that a uniform and highly standardized product is obtained. It is not possible for the attendant to discharge the materials from the mixing drum before they have been subjected to the mixing action thereof for the full length of the predetermined mixing time, and neither will the daily output of the machine be penalized by permitting the batches to be mixed for a longer period of time than is necessary.

After the block 37 has been properly adjusted upon the quadrant 38, the mixer is charged in the usual manner by means of the loading skip C. The loading skip acts through the plunger 28 to move the resetting arm 8 upwardly, and this in turn acts to swing the escapement operating lever 10 upwardly into operative position, and also to move the control lever 49 into operative position. The spring 52 provides a resilient connection between the control lever and the shaft 50, and this prevents any possibility of breakage of the parts in the event the cam member 74 of the discharge chute operating shaft should be in the path of the plunger 73 when the loading skip is swung upwardly to charge the mixing drum. In other words, if the attendant should have failed to swing the discharge chute D back into non-discharging position before causing the loading skip C to be raised, with the result that downward movement of the plunger 73 is prevented by the cam member 74, the spring 52 will permit relative rotation of the control lever 49 and shaft 50, thereby preventing breakage of the parts. As soon as the discharge chute D is swung into non-discharging position, the action of the springs will, of course, cause the locking plunger 73 to slide downwardly into operative engagement with the flat face of the cam member 74, thereby bringing all of the parts into proper operative position. When the escapement operating lever 10 reaches the lower limit of its movement at the termination of the mixing period, the locking detent 64 is moved to release the control lever 49 which is then swung by the action of the spring 54 to actuate the signal, release the discharge chute locking means, and operate the batch counter 4.

Figures 18, 20:
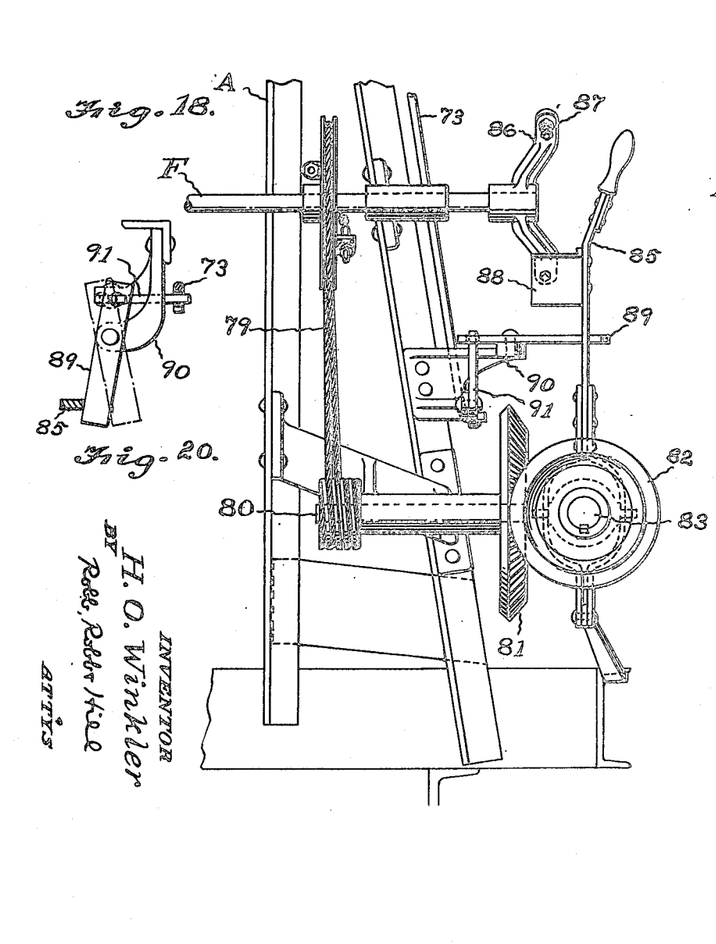
Figures 18, 19 and 20 are detail views showing the adaptation of the locking means to a power operated discharge chute.
Figure 19:
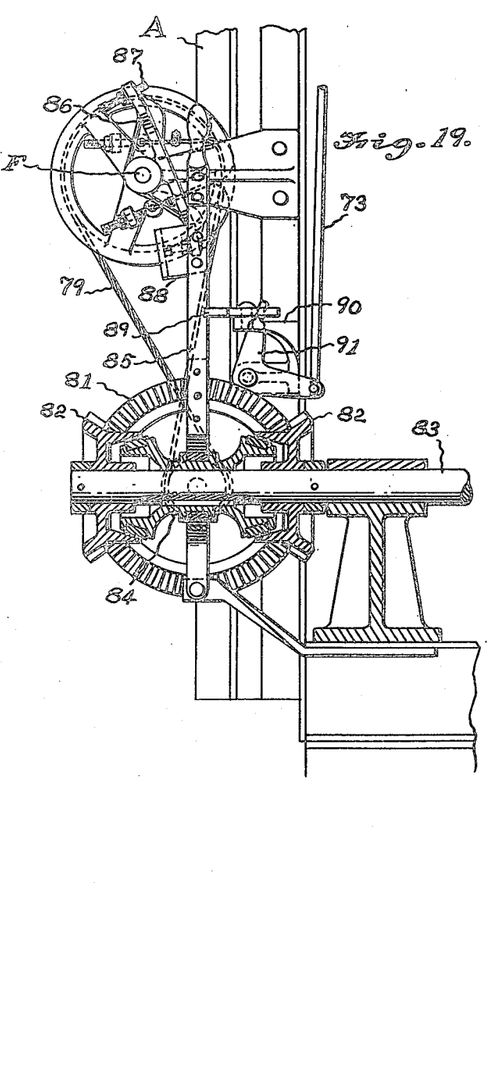
Figure 21:
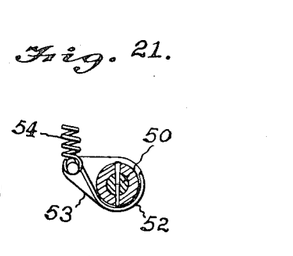
Figure 21 is a detail sectional view on the line 21—21 of Figure 9.

On Figs. 18 and 19, I have shown a construction which adapts the batch meter for use in connection with concrete mixers in which a power means is utilized for operating the discharge chute and swinging the same into and out of discharge position. The discharge chute operating shaft F may be operatively connected with the discharge chute D in any suitable manner, and has a cable and pulley connection, such as that shown in a conventional manner at 79 with a counter shaft 80. Fixed upon the counter shaft is a bevel gear wheel 81 which meshes with a pair of bevel pinions 82, the latter being loose upon a power shaft 83 which is driven constantly when the machine is in operation. A suitable clutch 84 is mounted upon the power shaft 83 and adapted to be moved into engagement with either one of the pinions 82 to lock the same with the power shaft. A lever 85 controls the clutch member 84 and when the lever is moved in one direction, one of the pinions 82 is locked with the power shaft and the gear wheel 81 rotated to swing the discharge chute D of the mixing machine into discharge position. When the said lever is moved in the other direction, the other pinion 82 is locked with the power shaft and the gear wheel 81 rotated in such a direction as to swing the discharge chute D into non-discharging position. Suitable knock-out means is provided for automatically moving the lever 85 into a neutral position when the discharge chute D reaches the limit of its movement in either direction, thereby preventing breakage of the parts. For this purpose, the shaft F is shown as provided with a knock-out lever 86 having adjustable studs 87 at the ends thereof which are adapted to engage a wing 88 on the lever 85. This latter is moved manually in either direction to manipulate the clutch member 84 and operate the discharge chute D. As soon as the discharge chute reaches the limit of its movement one of the studs 87 of the knock-out lever 86 engages the wing 88 of the lever 85 and moves the latter into a neutral position, thereby automatically breaking the driving connection between the power shaft 83 and the discharge chute.

When the discharge chute D is in non-discharge position, the operating lever 85 is locked against movement in one direction by engagement with one of the studs 87, and against movement in the other direction by engagement with one end of a horizontally disposed locking lever 89. This lever is pivoted between its ends upon a bracket 90, and the opposite end thereof is operatively connected by means of a bell crank lever 91 to the plunger 73 of the batch meter mechanism. When this plunger is moved downwardly, the locking lever 89 is brought into engagement with the discharge chute operating lever 85, thereby preventing movement of the said lever 85 to operate the clutch member and cause the discharge chute D to be moved into discharging position. However, at the termination of the mixing period, the upward movement of the plunger 73 swings the locking lever 89 into an inoperative position. The attendant can then manipulate the lever 85 in the necessary manner to cause the discharge chute D to be brought into discharging position. It will be obvious that with other modifications the batch meters can be adapted to be used in connection with other types of mixing machines.

Figure 1:
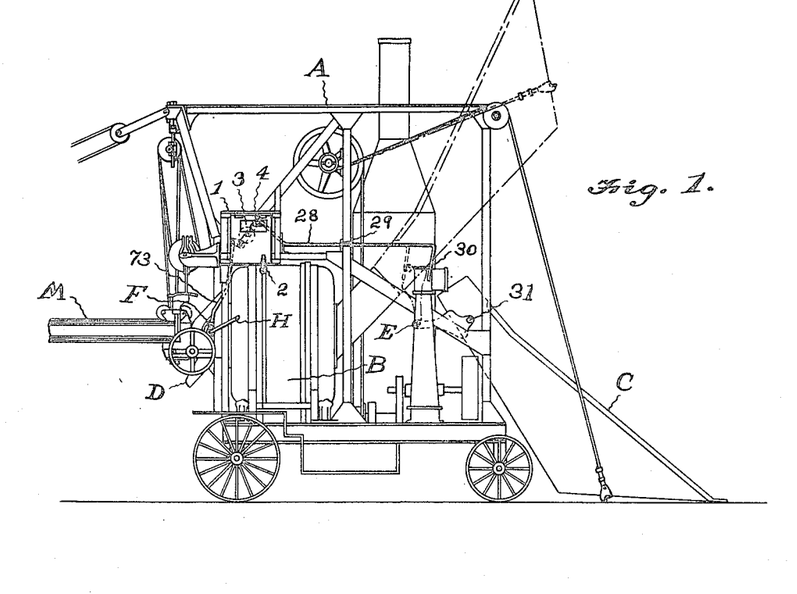
Figure 1 is a side elevation of a conventional type of paving mixer with a batch meter constructed in accordance with the invention operatively mounted thereon.
Figure 2:
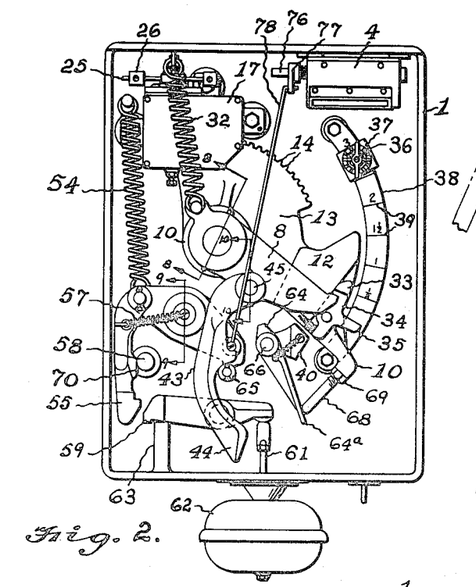
Figure 2 is a front elevation showing the interior mechanism of the batch meter with the parts thereof in the positions assumed when the device is not in operation.
Figure 3:
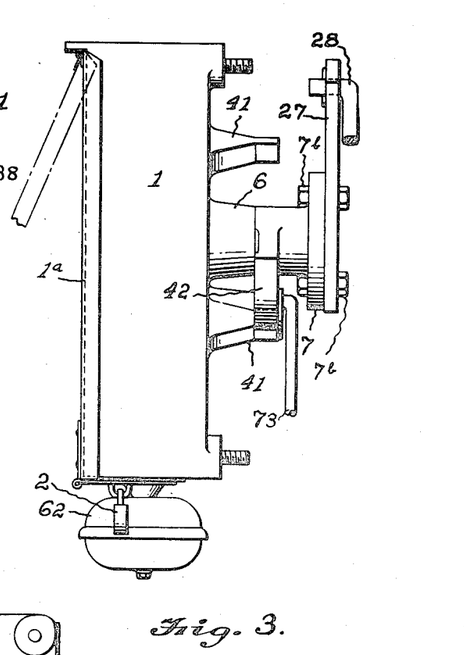
Figure 3 is a side elevation of the casing within which the batch meter mechanism is mounted, the positions assumed by the cover of the casing when swung outwardly toward an open position being indicated by dot and dash lines.
Figure 4:
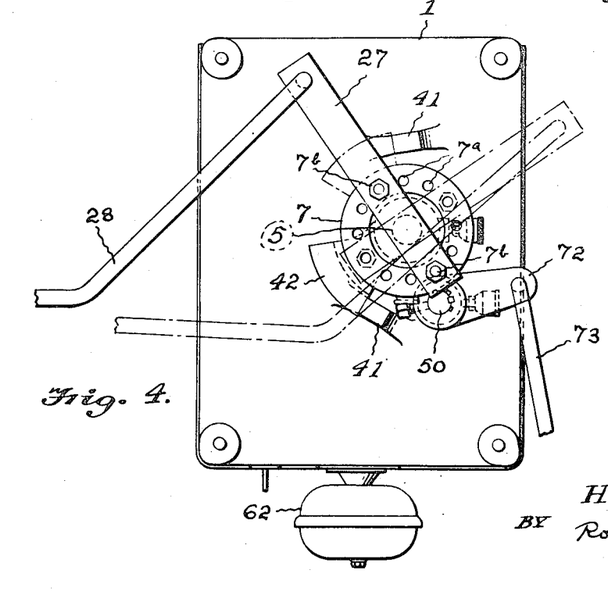
Figure 4 is a rear view of the device, the arm and plunger which are actuated by the charging device to start the batch meter into operation being shown by full lines in normal position and by dot and dash lines in the position assumed after being actuated by the charging mechanism.
Figure 5:
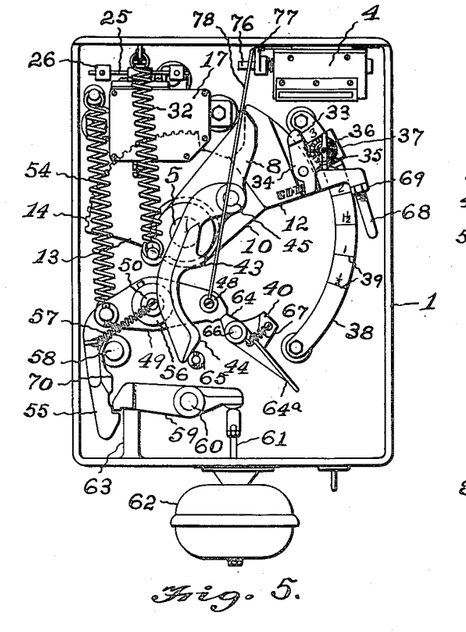
Figure 5 is a view similar to Figure 2, showing the parts in the positions assumed when the loading skip for the mixer has been elevated to charge the materials into the mixer drum.
Figure 6:
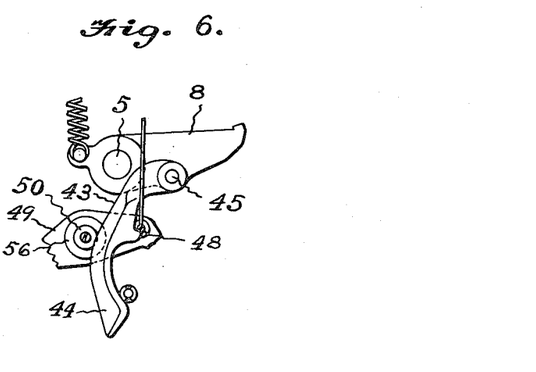
Figure 6 is a detail view showing the cam hook member which is carried by the resetting arm in the act of being disengaged from the stud of the control lever.
Figure 7:
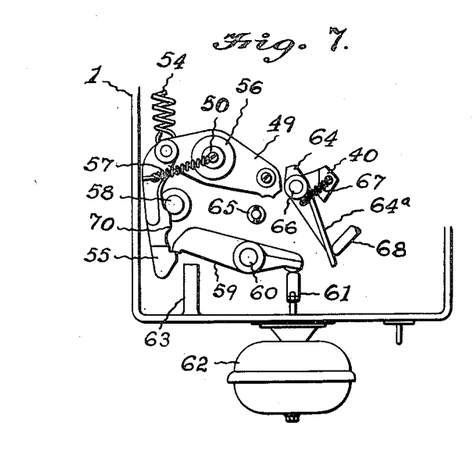
Figure 7 is a detail view of the control lever and associated parts, showing the parts in the position assumed when the locking detent has been released and the tappet operating lever is about to be disengaged from the pawl to permit the ringing of the bell.
Figure 8:
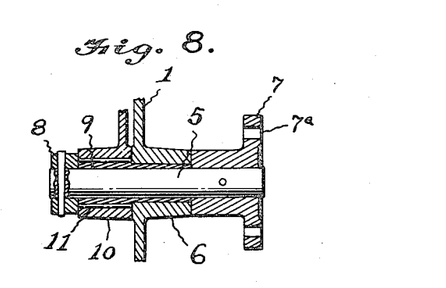
Figure 8 is an enlarged sectional view on the line 8—8 of Figure 2.

The hub 7 of the main shaft may, as indicated clearly by Figures 3 and 4 of the drawings, be in the form of a disc which is provided with a peripheral series of openings 7ᵃ. The bar 27 to which the plunger 28 is connected, is shown as secured to the hub 7 by means of a pair of fastening members such as the bolts 7ᵇ which pass through a selected pair of the openings 7ᵃ. This construction enables the bar 27 to be set in different angular positions relative to the main shaft 5, as may be necessary in mounting the mechanism upon any particular mixer and properly adjusting the same. At the same time a very strong and rigid connection is obtained which will withstand the shocks and hard usage to which such devices are subjected when in operation. After the device has once been properly adjusted the parts will retain their relative positions and the adjustment will not be lost after a short period of use.

Figure 9:
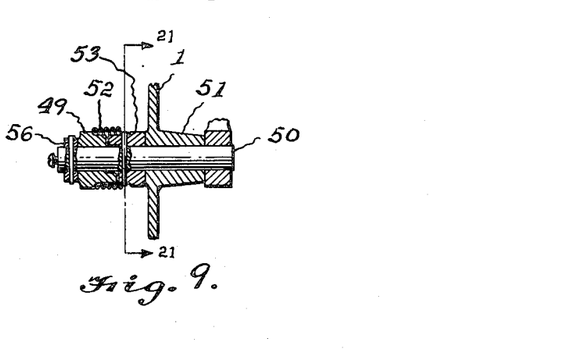
Figure 9 is a similar view on the line 9—9 of Figure 2.

It may be mentioned that the spring 52 (see Figure 9) which constitutes the operative connection between the control lever 49 and the locking device, is stiffer than the spring 54 which normally actuates the control lever and associated parts, so that the spring 52 really constitutes a safety device and only functions at those times when the operator has failed to move the discharge chute of the mixer back into non-discharging position and the downward movement of the locking plunger is prevented by the disc with which it normally cooperates to control the movements of the discharge chute.

With obvious modifications this batch meter can be adapted for use upon any type of mixing machine. The mechanism can obviously be used with or without the actual lock for the discharge chute of the mixer, as may be desired. If the lock itself is omitted the operation of the signal will indicate the termination of the mixing period to the attendant who can then discharge the drum. On the other hand, the signal may be omitted and the lock retained, in which event the discharge chute is locked against operation until the expiration of the predetermined mixing time. The batch counter may or may not be used, as desired, and it might be employed in connection with either the locking means alone or the signal alone. It has been found, however, that the entire combination of elements is usually preferred in actual practice, and especially in connection with concrete paving machines, since when operating such machines under the usual conditions, a check is kept upon the work and a thoroughly mixed and uniform output insured by the use of a batch meter performing all of the functions described. Obviously, slight modifications and changes can be made in the details of construction without departing from the spirit of the invention and within the scope of the appended claims.

Having thus described my invention what I claim as new and desire to secure by Letters Patent is:

1. The combination with a mixing machine including a mixer and charging and discharging means associated therewith, of timing means including an escapement mechanism, said timing means being controlled by the charging means and governing the discharging means, whereby materials charged into the mixer may be mixed a predetermined time before being discharged.

2. The combination with a mixing machine including a mixer and charging and discharging means associated therewith, of timing means including an escapement mechanism and adjustable for different periods of time, said timing means being controlled by the charging means and governing the discharging means, whereby materials charged into the mixer may be mixed a predetermined time before being discharged.

3. The combination with a mixing machine including a mixer and charging and discharging means associated therewith, of timing means including a member movable in one direction when the mixer is charged, positive means tending to return the member to its original position, means regulating the extent of movement of the member when the mixer is charged, means retarding the return of the member whereby the time of return depends upon the extent of its original movement, and means actuated by the member upon its return to govern the discharging means.

4. The combination with a mixing machine including a mixer and charging and discharging means associated therewith, of timing means including a member movable in one direction when the mixer is charged, positive means tending to return the member to its original position, an escapement mechanism, gearing between the member and the escapement mechanism whereby the member moves independently of the escapement mechanism upon its original movement when the mixer is charged and is retarded by the escapement mechanism upon its return movement, and means actuated by the member upon its return for governing the discharging means.

5. The combination with a mixing machine including a mixer and charging and discharging means associated therewith, of timing means comprising a member movable in one direction when the mixer is charged, means for regulating the extent of the said movement, positive means tending to return the member to its original position, an escapement mechanism, gearing between the member and the escapement mechanism whereby the member moves independently of the escapement mechanism when the mixer is charged and is retarded by the escapement mechanism upon its return movement, the time required for the return movement being determined by the extent of the movement of the member when the mixer is charged, and means actuated by the member upon its return for governing the discharging means.

6. The combination with a mixing machine including a mixer and charging and discharging means associated therewith, of timing means comprising a movable member, a resetting member actuated by the charging means to move the member in one direction when the mixer is charged, adjustable means for regulating the extent of said movement, positive means tending to return the member to its original position, and escapement mechanism retarding the return movement so that the time consumed in the return movement depends upon the extent of the original movement of the member when the mixer is charged, and means actuated by the member upon its return for governing the discharge means.

7. The combination with a mixing machine including a mixer and charging and discharging means associated therewith, of a timing device comprising a movable member, a resetting member actuated by the charging means and releasably engaging the member to move it in one direction, adjustable trip means for disengaging the member from the resetting member after it has been moved a predetermined distance, positive means tending to return the member to its original position, an escapement mechanism retarding the return movement whereby a predetermined time depending upon the extent of the original movement of the member is required for the return of the member, and means actuated by the member upon its return for governing the discharge means.

8. The combination with a mixing machine including a mixer and charging and discharging means associated therewith, of a timing device comprising a movable member, a resetting member actuated by the charging means, a releasable engagement including a dog between the resetting member and the first mentioned member whereby the latter is moved in one direction with the resetting member, adjustable trip means for automatically releasing the dog after the member has moved a predetermined distance with the resetting member, positive means tending to return the member to its original position, an escapement mechanism retarding the return of the member whereby a predetermined time depending upon the extent of the original movement of the member is required for the return of the member and means actuated by the member upon its return for governing the discharge means.

9. The combination with a mixing machine including a mixer and charging and discharging means associated therewith, of a timing device comprising a weighted lever, means for swinging the weighted lever upwardly, an escapement mechanism geared to the weighted lever and permitting the unresisted upward movement thereof, but retarding the return movement thereof, and means actuated by the weighted lever upon its return for governing the discharge means.

10. The combination with a mixing machine including a mixer and charging and discharging means associated therewith, of a timing device comprising a weighted lever, a resetting member actuated by the charging means for swinging the weighted lever upwardly, means for regulating the extent of upward movement of the weighted lever, an escapement mechanism associated with the weighted lever to permit the unresisted upward movement thereof and retard the return movement thereof whereby a predetermined time depending upon the extent of the initial upward movement of the weighted lever is required for the return movement thereof, and means actuated by the weighted lever upon its return for governing the discharge means.

11. The combination with a mixing machine including a mixer and charging and discharging means associated therewith, of a timing device comprising a weighted lever, a resetting arm actuated by the charging means, a releasable engagement between the resetting arm and the weighted lever for moving the weighted lever upwardly with the resetting arm, an adjustable trip means for automatically releasing the said engagement after the weighted lever has been moved upwardly a predetermined extent, escapement means associated with the weighted lever to permit the unresisted upward movement thereof and retard the return movement thereof whereby a predetermined time depending upon the extent of the original upward movement is required for the return movement of the weighted lever, and means actuated by the weighted lever upon its return for governing the discharge means.

12. The combination with a mixing machine including a mixer and charging and discharging means associated therewith, of a timing device comprising a lever, a resetting arm mounted concentric with the lever and actuated by the charging means, a releasable engagement between the resetting arm and the lever whereby the lever is moved in one direction by the resetting arm, means for releasing the engagement after the lever has been moved a predetermined amount, positive means tending to return the lever to its original position, an excapement means associated with the lever and permitting the unresisted original movement of the lever but retarding the return movement thereof whereby a predetermined time is required for the said return, and means actuated by the lever upon its return for governing the discharge means.

13. The combination with a mixing machine including a mixer and charging means, of a timing mechanism for automatically measuring the mixing period, and control means for the timing mechanism including a shaft, an arm adjustable to different angular positions upon the shaft, and a plunger operatively connected to the arm and arranged to be actuated by the charging means.

14. The combination with a mixing machine including a mixer and charging means, of a timing device for automatically measuring the mixing period, and control means for the timing device including a shaft formed with a hub, an arm adjustably mounted upon the hub in different angular positions and positively connected thereto at a plurality of points, and a plunger operatively connected to the arm and actuated by the charging means.

15. The combination with a mixing machine including a mixer and charging means, of a timing device for measuring the mixing period, and control means for the timing device including a shaft provided with a hub member formed with a peripheral series of openings, an arm adapted to be secured to the hub in different adjusted positions by fastening members engaging a plurality of the said openings, and a plunger operatively connected to the arm and arranged to be actuated by the charging means.

16. The combination with a mixing machine including a mixer and charging and discharging means associated therewith, of a positively actuated control member, means operated by the charging means for setting the control member, timing means controlled by the charging means, detent means for holding the control member in a set position and arranged to be actuated by the timing means to release the control member at the expiration of a predetermined time, and means actuated by the control member to govern the discharge means.

17. The combination with a mixing machine including a mixer and charging and discharging means associated therewith, of a positively actuated control member, a timing device, a resetting arm actuated by the charging means and having operative connections with the control member and timing means, detent means holding the control member in a set position until it is released by the operation of the timing means at the expiration of a predetermined time, and means actuated by the control member for governing the discharge means.

18. In combination, a concrete mixing machine comprising a mixer, a charging device, and a discharging device, with a self contained batch meter mechanism mounted upon the machine, means intermediate said batch meter mechanism and one of the said devices above mentioned for governing the said device, means intermediate the batch meter mechanism and the charging device for setting the batch meter mechanism into action, and the said batch meter mechanism comprising a timing contrivance for determining a proper mixing period of time consisting of an escapement device substantially as described.

19. In combination, a mixing machine comprising a mixer, a charging device, and a discharging device, both for co-operation with the mixer, a lock for the discharging device, a batch meter, means intermediate the match meter and the discharging device for locking the latter during a predetermined time of mixing controlled by the batch meter, mechanism in the batch meter for releasing said lock, and a safety device intermediate the batch meter and the lock for permitting a special relative movement of said parts in the event that the lock is actuated for co-operation with the discharging device when the latter is in an abnormal position preventing such co-operation for the time being.

20. A machine of the combination substantially as set forth in claim 19, wherein the safety device comprises an actuating part of the batch meter and a resilient connection between said actuating part and the lock which co-operates with the discharging device.

21. The combination with a mixing machine including a mixer and charging and discharging means associated therewith, of a positively actuated control member, timing means, a resetting arm actuated by the charging means and operating simultaneously to set the control member and start the timing means in operation, a detent holding the control member in a set position, means actuated by the timing means for automatically releasing the detent at the expiration of a predetermined time, and means actuated by the control member when released for governing the discharge means.

22. The combination with a mixing machine including a mixer and charging and discharging means associated therewith, of a timing device including a lever, means for swinging the lever in one direction when the mixer is charged, positive means tending to return the lever to its original position, an escapement mechanism operatively connected with the lever to permit the unresisted original movement thereof and retard the return thereof, and means actuated by the lever upon its return for governing the discharge means.

23. The combination with a mixing machine including a mixer and charging and discharging means associated therewith, of a positively actuated control lever, means actuated by the charging means for setting the control lever, a detent releasably holding the control lever in a set position, timing means controlled by the charging means for automatically releasing the detent at the expiration of a predetermined mixing time, a lock member for the discharging means actuated by the control lever, and a safety connection between the lock member and the control lever to permit relative movement of the parts in an emergency.

24. The combination with a mixing machine including a mixer and charging and discharging means associated therewith, of a positively actuated control lever, means actuated by the charging means for setting the control lever, means for automatically releasing the control lever at the expiration of a predetermined mixing time, a rock shaft for the control lever, a lock for the discharge means controlled by the rock shaft, and a yieldable connection between the control lever and the rock shaft to provide for relative movement of the parts in an emergency.

25. The combination with a mixing machine including a mixer and charging means associated therewith, of a positively actuated control lever, means actuated by the charging means for setting the control lever, means for automatically releasing the control lever at the expiration of a predetermined mixing time, a signal, a tappet lever for operating the signal, and means for tilting and releasing the tappet lever upon the operation of the control lever.

26. The combination with a mixing machine including a mixer and charging means associated therewith, of a positively actuated control lever, means actuated by the charging means for setting the control lever, means for releasing the control lever at the expiration of a predetermined mixing time, a signal, a tappet lever for operating the signal, a pawl connection between the control lever and the tappet lever, and means for moving the pawl to disengage the tappet lever after the tappet lever has been given the proper initial movement.

27. The combination with a mixing machine including a mixer and charging and discharging means associated therewith, of a positively actuated control lever, a resetting arm actuated by the charging means, a releasable connection between the resetting arm and the control lever, means for releasing the said connection when the control lever has been moved into a set position, a detent for holding the control lever in a set position, timing means controlled by the resetting arm and releasing the detent at the expiration of a predetermined mixing time, and means actuated by the control member when released for governing the discharge means.

28. The combination with a mixing machine including a mixer and charging and discharging means associated therewith, of a positively actuated control lever, a resetting arm actuated by the charging means, a releasable connection between the resetting arm and the control lever, means for releasing the said connection when the control lever has reached a set position, a detent for locking the control lever in a set position, timing means, a releasable connection between the resetting arm and the timing means, adjustable trip means for breaking the said releasable connection at different points depending upon the desired length of the mixing time, the before mentioned detent being moved by the timing means to release the control lever at the end of the mixing time, and means actuated by the control member when released for governing the discharging means.

29. The combination with a mixing machine including a mixer and charging means associated therewith, of a positively actuated control lever, a resetting arm actuated by the charging means, a cam hook member connecting the resetting arm and control lever, means cooperating with the cam hook member to automatically swing the same into inoperative position when the control lever has reached a set position, timing means controlled by the resetting arm, a detent holding the control lever in a set position and released by the timing means at the expiration of a predetermined mixing time, and means actuated by the control lever when released for governing the discharge means.

30. The combination with a mixing machine including a mixer and charging and discharging means associated therewith, of a lock for the discharging means, a signal, a positively actuated common control member for the lock and signal, means actuated by the charging means for setting the control member, and means for automatically releasing the control member at the expiration of a predetermined mixing time.

31. The combination with a mixing machine including a mixer and charging and discharging means associated therewith, of a lock for the discharging means, a signal, a batch counter, a positively actuated control member operatively connected to the lock, signal and counter, means actuated by the charging means for moving the control member into a set position, and means for releasing the control member at the expiration of a predetermined mixing time.

32. The combination with a mixing machine including a mixer and charging and discharging means associated therewith, of a positively actuated control member, means actuated by the charging means for setting the control member, means for releasing the control member at the expiration of a predetermined mixing time, a plunger actuated by the control member, and a locking disc associated with the discharging means and cooperating with the plunger to lock the discharging means.

33. The combination with a mixing machine including a mixer and charging and discharging means associated therewith, including an operating member for the discharging means, a locking member movable into engagement with the operating member to prevent actuation of the discharging means, a plunger controlling the locking member, a positively actuated control member for the plunger, means actuated by the charging means for setting the control member, and means for releasing the control member at the expiration of a predetermined mixing time.

In testimony whereof I affix my signature.

HENRY O. WINKLER.